(12) United States Patent
Bilger et al.

(10) Patent No.: US 11,714,914 B2
(45) Date of Patent: *Aug. 1, 2023

(54) SECURE STORAGE OF PASSWORDS

(71) Applicant: Verizon Patent and Licensing Inc., Basking Ridge, NJ (US)

(72) Inventors: Brent R. Bilger, Los Altos Hills, CA (US); Rajesh M. Patel, Saratoga, CA (US); Shailesh K. Venugopal, Gilroy, CA (US); William F. Copeland, Garland, TX (US); Michel J. Basmaji, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/679,459

(22) Filed: Feb. 24, 2022

(65) Prior Publication Data

US 2022/0179984 A1    Jun. 9, 2022

Related U.S. Application Data

(63) Continuation of application No. 16/691,157, filed on Nov. 21, 2019, now Pat. No. 11,281,789.

(51) Int. Cl.
*G06F 21/62* (2013.01)
*H04L 9/32* (2006.01)
*H04L 9/00* (2022.01)
*H04L 9/08* (2006.01)
*H04L 9/30* (2006.01)

(52) U.S. Cl.
CPC .......... *G06F 21/6209* (2013.01); *H04L 9/006* (2013.01); *H04L 9/0877* (2013.01); *H04L 9/302* (2013.01); *H04L 9/3242* (2013.01)

(58) Field of Classification Search
CPC .............. G06F 21/6209; H04L 9/006; H04L 9/0877; H04L 9/302; H04L 9/3242
See application file for complete search history.

(56) References Cited

U.S. PATENT DOCUMENTS

| | | | | |
|---|---|---|---|---|
| 2009/0300364 | A1* | 12/2009 | Schneider | H04L 9/3247 713/178 |
| 2011/0302012 | A1* | 12/2011 | Duroux | G06Q 30/0215 705/14.17 |
| 2014/0298441 | A1* | 10/2014 | Yamaguchi | H04L 63/0815 726/8 |

* cited by examiner

*Primary Examiner* — Ayoub Alata

(57) ABSTRACT

A device includes a memory and a processor. The processor is to execute the instruction to: receive, from a user device, a username of a user and a string; retrieve a first Message Authentication Code (MAC) and a salt from a database in response to receiving the username and the string; send the first MAC, the salt, and one or more parameters to a Hardware Security Module (HSM); receive, from the HSM, a message indicating whether the first MAC matches a second MAC that the HSM generates based on the one or more parameters and the salt. In addition, the processor to perform one of: authenticate the user when the message indicates that the first MAC matches the second MAC; or not authenticate the user when the message indicates that the first MAC does not match the second MAC.

20 Claims, 8 Drawing Sheets

| PASSWORD | HASH |
|---|---|
| ACORN | A129E2C24A98EF |
| AMOEBA | 312AE2B14AC811 |

116 →

SECURE STORAGE OF PASSWORDS

RELATED APPLICATION

The present application is a continuation of, and claims priority to, U.S. application Ser. No. 16/691,157 filed Nov. 21, 2019, the contents of which are incorporated by reference herein in their entirety.

BACKGROUND INFORMATION

Cyber security is important for organizations that conduct their transactions over networks. Having network presence exposes the organization to attempts to obtain unauthorized access, to denial-of-service attacks, and/or to attempts to steal information. Such organizations typically implement, for example, firewalls, password protection schemes, encryption, secure protocols, and other prophylactic measures to defend against network attacks. Each of such schemes protects the networks in different ways. For example, two-factor authentication protects against impersonation, by increasing the difficulty of unauthorized login.

DETAILED DESCRIPTION OF PREFERRED EMBODIMENTS

The following detailed description refers to the accompanying drawings. The same reference numbers in different drawings may identify the same or similar elements. As used herein, the term "nonce" may refer to a number used once in communications.

Implementations described herein relate to secure storage of passwords. Secure storage of passwords may eliminate or minimize any damage that may result from stolen user credentials.

Figures 1A, 1B:
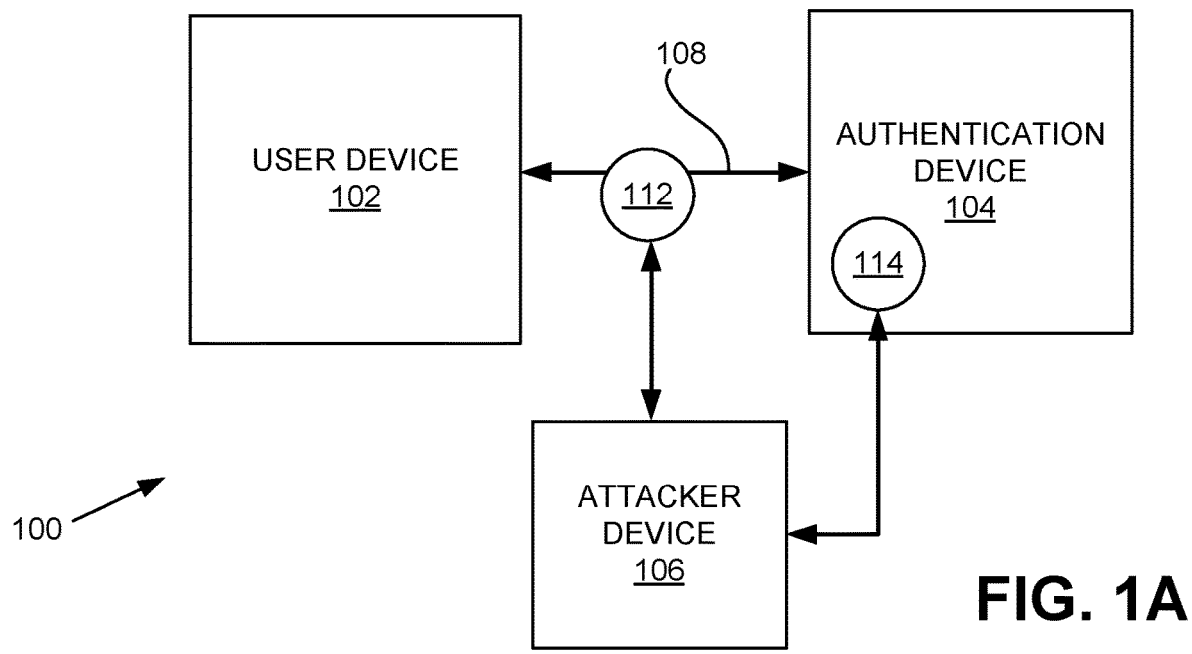
FIG. 1A illustrates different types of cyber-attacks.
FIG. 1B shows an exemplary rainbow table.

FIG. 1A illustrates different types of cyberattacks. As shown, the attacks may occur in the context of a user device 102 communicating with an authentication device 104. In one type of attack, an attacker device 106 may attempt to intercept messages between user device 102 and authentication device 104. For device 102 to access a user account or network resources, device 102 may send user credentials to authentication device 104 over communication channel 108, to validate the user identity. By monitoring channel 108 (at a location 112), attacker device 106 may capture the messages. Typically, channel 108 would be encrypted, and therefore, it would be difficult for attacker device 106 to obtain user credentials by monitoring channel 108.

Another type of cyberattack may involve attacker device 106 attempting to steal user credentials at location 114 within device 104. Many types of attacks exist. For example, an adversary may perform a phishing attack on an administrator or a user to steal the database of user credentials. Although authentication device 104 may be relatively well-protected against intrusions, a large body of user credentials stored therein provides potential cyber attackers with a greater incentive to break into device 104. For example, each year many organizations are subjected to network hacking and have their databases of usernames and passwords stolen. Often, attackers post the contents of these databases on the Internet, where hackers have cracked weak cryptographies used to conceal the passwords. Thus, it is important for authentication device 104 to store user credentials in a format that does not reveal the plaintext passwords that the users provided through device 102.

The simplest and the least secure way of storing user credentials at location 114 is to record the usernames and passwords in plaintext. That is, when user device 102 sends the plaintext password and the username at the time of creation of the login account, the plaintext password and the username are stored in its user credentials database. If the database is stolen by an attacker, then all of the passwords become known to the attacker and can be used to access user accounts.

The next least secure way to store user credentials is to store cryptographic hashes of passwords rather than plaintext passwords. "Hashing," as referred to herein, may include the process of translating or mapping a string of bits of any length into another string of a fixed length, based on a mathematical algorithm or a function (herein referred to as a "hash function" or "cryptographic hash function"). Storing a hashed password begins with user device 102 receiving a username and a plaintext password from the user. After the receipt of the user credentials, user device 102 sends the username and the password pair to authentication device 104 over channel 108. When authentication device 104 receives the password and the username, authentication device 104 generates a hash of the password and records the hash along with the username in a database. Thereafter, when user device 102 attempts to authenticate at device 104, user device 102 resends the password and the username. Upon receipt of the credentials, authentication device 104 regenerates the hash based on the resent password. Using the username as the key, device 104 retrieves the stored hash from the database and compares it to the regenerated hash. If the hashes match, device 104 concludes that the user is authentic.

Storing hashed passwords at device 104 is more secure than storing plaintext passwords, because if the attacker steals a database of hashed passwords, the plaintext passwords are not available to the attacker. Therefore, the attacker will not be able to directly use the stolen information to impersonate the users.

Today, although preferable to storing plaintext passwords, storing hashed passwords still may not be sufficiently secure for a number of reasons. For example, some mathematical algorithms (e.g., Message Digest algorithm 5 (MD-5), Secure Hash Algorithm 1 (SHA-1), SHA-2, etc.) used to generate hashes may be well known. In such cases, an adversary can discover the plaintext passwords to which the algorithm was applied to generate the hashes. For example, the adversary may apply the algorithm to most commonly used plaintext passwords to generate hashes. If a generated hash is in the stolen database, the adversary knows that the string used to generate the hash is the plaintext password.

Another reason that simply storing hashed passwords may not be secure is due to possible uses of rainbow tables. The term "rainbow table," as used herein, refers to a precomputed table of hashes and corresponding passwords. FIG. 1B illustrates an exemplary rainbow table 116. As shown, each entry in table 116 includes a plaintext password and a hash of the password. By looking up a hash in a rainbow table, it is possible to derive the corresponding plaintext password, even if the hashing algorithm used to generate a hash from the plaintext is robust.

Typically, to guard against uses of rainbow tables, passwords are not simply hashed and stored. Rather, when authentication device 104 receives a new set of user credentials (i.e., a plaintext password and the corresponding username) from device 102, authentication device 104 generates a "salt," which is a large random number. Device 104 then concatenates the salt to the plaintext password (either pre-appends to the beginning of the password or appends to the end of the password) and hashes the concatenated text. Device 104 then inserts the username, the hash of the salted password (i.e., the concatenation of the plaintext password and the salt), and the salt in the database. The salt for each entry is different from those of other entries, even if the plaintext passwords for two different entries are identical.

Assuming that the attacker has stolen the database of hashes of salted passwords (herein referred to as "salted hashes"), to obtain the plaintext passwords, the attacker needs to address the problem of having to brute-force compute hashes based on large strings. This problem cannot be overcome by using rainbow tables.

Salted hashes, however, are still vulnerable to other approaches for cracking passwords. For example, salted hashes do not address the "man-in-the-middle" problem, in which an adversary monitors channel 108 to obtain plaintext passwords. In another example, high-performance hardware can be used to brute-force compute hashes of the one billion most common salted passwords. Each computed hash can then be compared with the hashes in the stolen database entries. If the computed hash matches the hash of an entry in the database, then the attacker knows the salted password—the password is the one on which the attacker performed the hash.

Today, password cracking is performed on Graphic Processing Units (GPUs) that have great computational power. Such components allow most common plaintext passwords, along with their salts, to be cracked relatively fast (e.g., on the order of millisecond, seconds, or tens of seconds). Therefore, storing salted hashes in the database may not provide sufficient protection against offline cracking of the hashes.

Currently, the "best practice" solution for storing passwords in a database is to use a slow hash algorithm (e.g., bcrypt) and/or run the hash multiple times. This requires the attacker to spend more time to crack each hash. However, as noted above, with attackers having the ability to harness a significant amount of processing power, using such slow hash functions are not enough to protect the passwords. In addition, using a slow hash function not only slows password cracking for the adversary, but also causes device 104 to become slow in authenticating legitimate users. This requires allocation of more processing power to device 104.

Implementations described herein relate to systems and methods for securely storing passwords. If the user credentials database is stolen from the system by a cyber attacker, none of the passwords can be determined by the attacker. No amount of currently available compute power is sufficient for the attacker to determine the passwords. In addition, the system does not require use of a computationally expensive hash function to slow down hashing of the passwords device 104 to quickly authenticate users.

Figure 2:
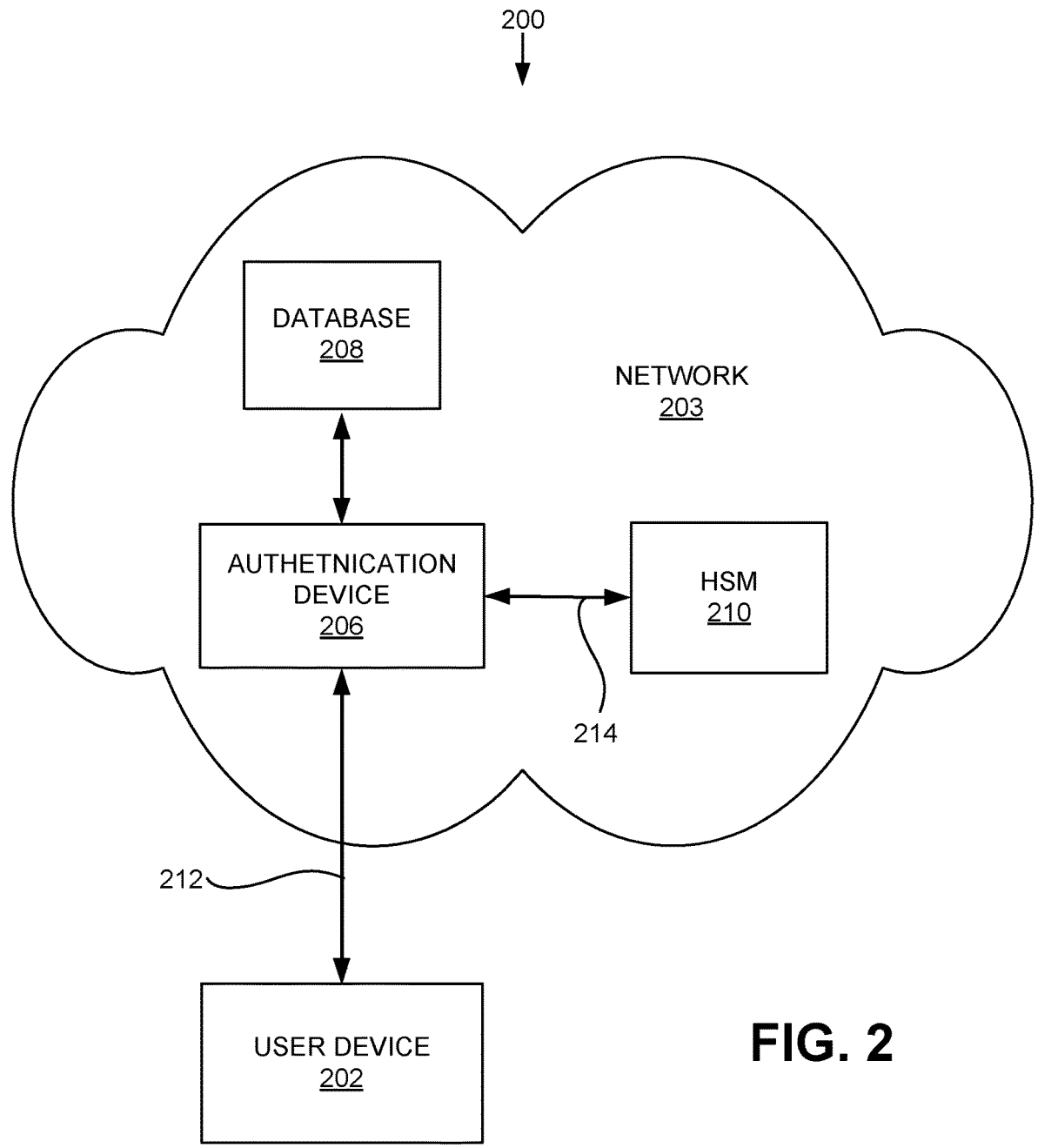
FIG. 2 depicts an exemplary network environment in which concepts described herein may be implemented.

FIG. 2 depicts an exemplary network environment 200 in which the concepts described herein may be implemented. As shown, network environment 200 may include user device 202 and network 203. In one implementation, device 202 may include a communication device. Examples of device 202 include: a personal computer that is connected to a network; a smart phone; a tablet device; a wearable computer device (e.g., a smart watch); a global positioning system (GPS) device; a laptop computer; a media playing device; a portable gaming system; and an Internet-of-Things (IoT) device. In some implementations, device 202 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. Device 202 may send packets to network 201 through a wireless link, optical link, wired link, etc.

Network 203 may allow device 202 to attach to network 203, to conduct a transaction (e.g., commercial transaction, a search, etc.), to obtain services (e.g., communication services), or to perform another type of network=related function. In some implementations, network 203 may include an access network (e.g., a radio network), which allows device 202 to connect to network 203. For example, the access network may establish and maintain, with participation from device 202, an over-the-air or over-the-wire channel with device 202; and maintain backhaul channels with a core part of network 203.

Examples of access networks include wireless access networks. Such access networks may include a Long-term Evolution (LTE) radio network, a Fifth Generation (5G) radio network, or other advanced radio network(s). These radio networks may include many wireless stations for establishing and maintaining an over-the-air channel with devices 202.

Network 203 may also include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, or a combination of networks. Network 203 may allow the delivery of Internet Protocol (IP) services to device 202, and may interface with other networks, such as packet data networks. In some implementations, the packet data networks may include an IP network, such as an IP Multimedia Subsystem (IMS) network. An IMS network may provide a Short Messaging Service (SMS), Voice-over-IP (VoIP) service, etc. In other implementations, network 203 not include the above-described networks, but merely one or more devices.

As further shown in FIG. 2, network 203 includes server 206, a database 208, and a Hardware Security Module (HSM) 210. Server 206 may include logic to receive, from user device 202, either a request to create a new login account or a request for authentication.

In one implementation, when server 206 receives a request to create a new login account/data, server 206 may generate a nonce N and send N and a public key $K_{PUB}$ to user device 102. Upon input of a username U and a password PWD from the user, user device 202 concatenates PWD and N to obtain the string PWD||N and encrypts PWD||N using the public key $K_{PUB}$ to produce the encrypted string T. User device 202 then sends U and T to server 206. Server 206 generates a new salt S and forwards T, N, and S to HSM 210 over channel 214. When HSM 210 responds by returning a new Message Authentication Code (MAC) to server 206, server 206 places a new entry comprising U, S, and the new MAC in database 208.

In the same implementation, when server 206 receives a request for authentication, server 206 may generate N and send N and $K_{PUB}$ to user device 102. Upon input of U and PWD by the user, user device 202 concatenates PWD and N to obtain the string PWD||N and encrypts PWD||N using $K_{PUB}$ to produce T. User device 202 then sends U, N, and T to server 206. Using username U as a key, server 206 then retrieves the corresponding MAC and S from database 208. Server 206 forwards the MAC, T, N, and S to HSM 210 over channel 214. When HSM 210 provides a response indicating whether the password is valid based on T, N, S, and the MAC, server 206 notifies user device 202 whether the user is authenticated.

In some simpler implementations, user device 202 may send U and PWD, rather than U and T, to server 206, for authentication. Such implementations relax the condition of using the encrypted string T against potential main-in-the-middle attacks for intercepting U and PWD. In such implementations, server 206 may perform operations that are different from those described above for authentication or for creating login data. Sine if these operations are described below with reference to FIG. 4.

In other implementations, user device 202 may still send U and T to server 206. However, in contrast to the above-described implementation, server 206 does not send T, N, S, and a MAC (retrieved from database 208) to HSM 210. Rather, server 206 first sends T and N to HSM 210 to have HSM 210 return PWD. To complete the authentication, server 206 then sends PWD, S, and the MAC retrieved from database 208 to HSM 210 to validate PWD. These operations are described below in greater detail with reference to FIG. 5.

Database 208 may include one or more login data entries. Each entry may include a username, a salt, and a Message Authentication Code (MAC) corresponding to the username. Server 206 may access database 208 during the creation of a new login data entry for the user or during an authentication process. For example, when server 206 is requested to create a new login data entry for the user, server 206 may access database 208 based on the username. Assuming that the username U does not already exist in database 208, server 206 may request HSM 210 to generate a new MAC based on encrypted string T, nonce N, and salt S. When HSM 210 generates a MAC based on T, N, and S and provides the MAC to server 206, server 206 may insert a new entry comprising U, S, and the MAC into database 208.

In another example, server 206 may access database 208 to retrieve a MAC and the salt S based on the username U. Once server 206 obtains the MAC and salt S from database 208, server 206 may send the MAC, T, N, and S to HSM 210 for validating the user credentials.

HSM 210 may include hardware for receiving, from server 206, information used in validating user credentials. The information may include a set of T, N, S, and a MAC. Upon receipt of T, N, S, and a MAC from server 206, HSM 210 derives the plaintext password PWD from T using the private key $K_{PRIV}$ and nonce N. HSM 210 then regenerates a MAC of its own using PWD, S, and a secret key $K_S$. If HSM 210 determines that the regenerated MAC is equivalent to the stored MAC (which is received from server 206), HSM 210 may indicate to server 206 that the user credentials are valid.

When HSM 210 receives a set of T, N, and S (but without a MAC) along with a request to generate a new MAC, HSM 210 may derive the plaintext password PWD from T using $K_{PRIV}$ and N. HSM 210 may then generate a new MAC using the PWD, S, and $K_S$ and forward the new MAC to server 206.

In many implementations, HSM 210 is configured to address not only the above-described security issues related to stolen databases of salted hashes, but also possible security risks at the physical level. For example, HSM 210 and/or its communication path 214 between server 206 and HSM 210 may be encased in a metal shielding or otherwise physically protected to prevent external monitoring of Radio Frequency (RF) signals from HSM 210. In addition, HSM 210 may be physically isolated from all devices in network 203, other than server 206. That is, only server 206 may access HSM 210. HSM 210 also may not export its internally generated secret key $K_S$. In one implementation, HSM 210 is at least Federal Information Processing Standard (FIPS)-120 level 3 or level 4 compliant.

In some implementations, HSM 210 may apply SHA-256 with a 64-byte (512-bit) key, as 512 is the internal block size of SHA-256. Additionally, HSM 210 may use a salt of approximately 44 bytes. If HSM 210 uses SHA-256 based algorithms for encryption, when server 206 determines that the plaintext password is less than 64 bytes, server 206 may pad the password so that the padded password is 64 bytes. Since most passwords are 20 bytes or less, adding a 44 byte-long salt to the 20 bytes or less long password will make the padded password approximately 64-bytes, which is close to the block size of the SHA-256 algorithm. Padding each password with a salt to maintain the block size preserves the optimum speed in generating MACs at HSM 210. If the password is more than 20 bytes long, then the password plus a salt may be more than 64 bytes. In such cases, the SHA-256 algorithm may require one or more additional passes using the hash function.

Depending on the implementation, network environment 200 may include devices and networks other than those illustrated in FIG. 2. Furthermore, for simplicity, FIG. 2 does not show all components that may be included in network environment 200 (e.g., routers, switches, bridges, wireless access point, additional devices 202). That is, depending on the implementation, network environment 200 may include additional, fewer, different, or a different arrangement of components than those illustrated in FIG. 2. For example, server 206 may include Trusted Platform Module (TPM) (e.g., to store $K_{PUB}$, $K_{PRIV}$, $K_S$) and additional software/hardware components in place of HSM 210.

Figure 3:
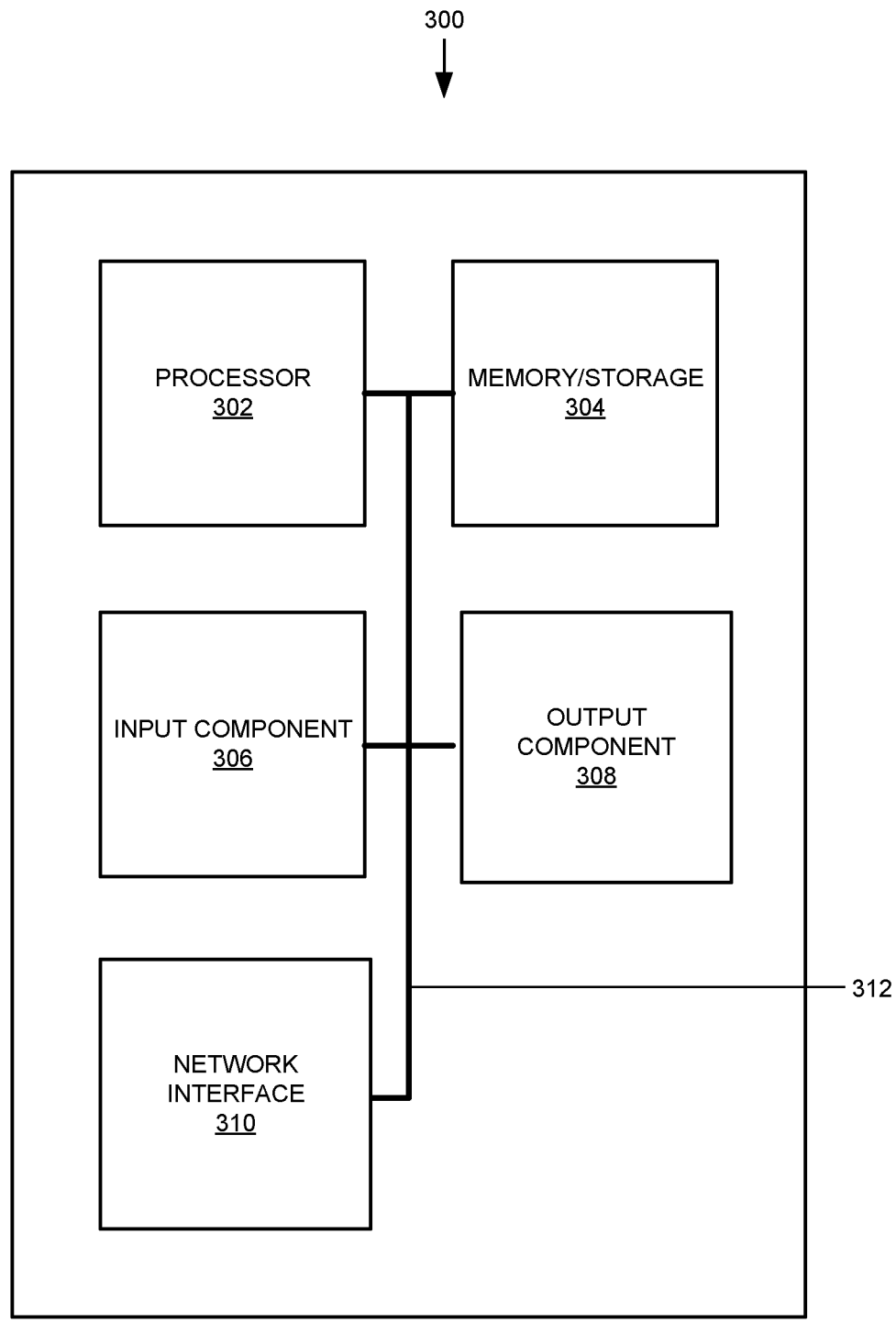
FIG. 3 shows exemplary components of a network device.

FIG. 3 depicts exemplary components of an exemplary device 300. Device 300 may correspond to or may be included in any of the components of FIG. 1A and FIG. 2 (e.g., user device 102, authentication device 104, user device 202, server 206, database 208, HSM 210, a router, a switch, etc.). As shown, device 300 may include a processor 302, memory/storage 304, input component 306, output component 308, network interface 310, and communication path 312. Depending on the implementations, device 300 may include additional, fewer, different, or a different arrangement of components than the ones illustrated in FIG. 3. For example, when implemented as HSM 210, device 300 may not include some of the components referenced below, such as a display, a network card, a network interface, a specific type of memory, a keyboard, a mouse, a microphone, and/or any other type of component that can compromise the security of HSM 210 or are ill-suited for the HSM 210 form factor.

Processor 302 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 300 and/or executing programs/instructions.

Memory/storage 304 may include static memory, such as read only memory (ROM), and/or dynamic memory, such as random access memory (RAM), or onboard cache, for storing data and machine-readable instructions (e.g., programs, scripts, etc.).

Memory/storage 304 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 304 may be external to and/or removable from device 300. Memory/storage 304 may include, for example, a Universal Serial Bus (USB) memory stick, a dongle, a hard disk, off-line storage, a Blu-Ray® disk (BD), etc. Memory/storage 304 may also include devices that can function both as a RAM-like component or persistent storage, such as INTEL® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 306 and output component 308 may provide input and output from/to a user to/from device 300. Input/output components 306 and 308 may include a display screen, a keyboard, a mouse, a speaker, a microphone, a camera, a DVD reader, USB lines, and/or other types of components for obtaining, from physical events or phenomena, to and/or from signals that pertain to device 300.

Network interface 310 may include a transceiver (e.g., a transmitter and a receiver) for device 300 to communicate with other devices and/or systems. For example, via network interface 310, device 300 may communicate over a network, such as the Internet, an intranet, a terrestrial wireless network (e.g., a WLAN, WIFI® WIMAX®, etc.), a satellite-based network, optical network, etc. As noted above, however, when implemented as HSM 210, device 300 may not include a network interface 310, but a secure interface through which HSM 210 can establish channel 214 to interact with server 206.

Network interface 310 may include an Ethernet interface to a LAN, and/or an interface/connection for connecting device 300 to other devices (e.g., a BLUETOOTH® interface). For example, network interface 310 may include a wireless modem for modulation and demodulation.

Communication path 312 may enable components of device 300 to communicate with one another.

Device 300 may perform the operations described herein in response to processor 302 executing software instructions stored in a non-transient computer-readable medium, such as memory/storage 304. When not implemented as HSM 210, the software instructions may be read into memory/storage from another computer-readable medium or from another device via network interface 310. The software instructions stored in memory/storage (e.g., memory/storage 304, when executed by processor 302, may cause processor 302 to perform processes that are described herein.

Figure 4:
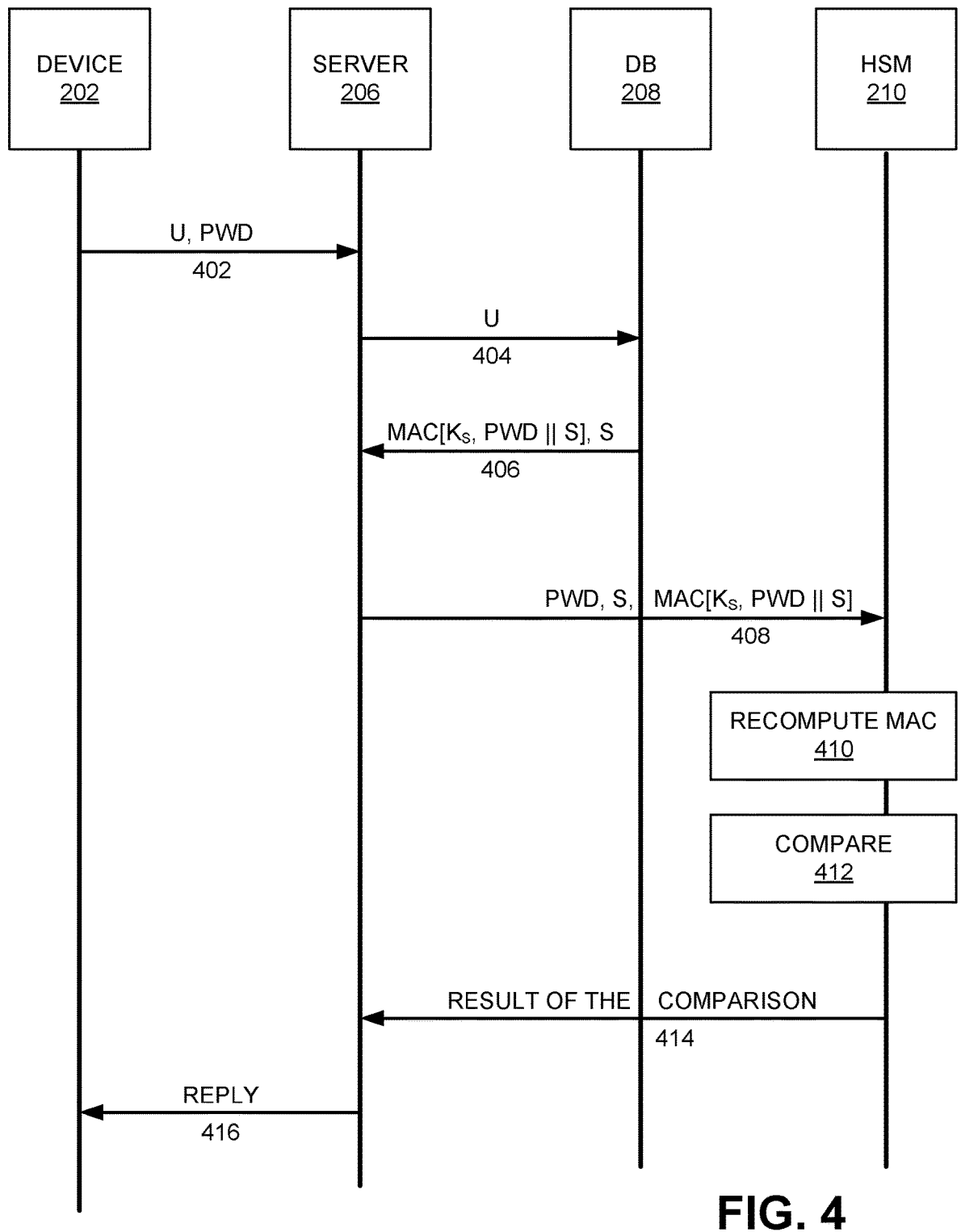
FIG. 4 is a sequence diagram that illustrates exemplary actions between components illustrated in FIG. 2 for secure storage of passwords according to one implementation.

FIG. 4 is a sequence diagram that illustrates exemplary actions between components illustrated in FIG. 2 for secure storage of passwords according to one implementation. For the diagram of FIG. 4, assume that HSM 210 has generated a secret key $K_S$ and has stored $K_S$ in its non-volatile memory. Furthermore, assume that database 208 stores MACs and salts for each usernames. For simplicity, FIG. 4 may not illustrate all actions that device 202, server 206, and HSM 210 perform.

As shown, server 206 receives a request, which includes a username U and a plaintext password PWD, for authentication from user device 202 (item 402). Depending on the implementation, server 206 may receive the request over a secure channel (e.g., a TLS/SSL encrypted channel). Upon receipt of U and PWD, server 206 then retrieves, from database 208, a MAC and a salt that correspond to username U (items 404 and 406). The MAC should have been previously generated by HSM 210 using its secret key $K_S$ and the result of concatenating PWD with salt S (i.e., PWD∥S).

As further shown, server 206 forwards PWD, S, and the MAC to HSM 210 (item 408). In response, HSM 210 generates a MAC by applying $K_S$ to the concatenation of PWD and S (i.e., PWD∥S) (item 410). HSM 210 then compares the generated MAC to the MAC from server 206 (item 412) and forwards the result of the comparison to server 206 (item 414). If the result indicates that the MACs match, the PWD is valid and server 206 sends a reply to user device 202 to notify that the user is authenticated.

In this implementation, because database 208 stores MACs rather than hashes, an adversary that steals database 208 will not be able to crack the passwords. However, if the channel between user device 202 and server 206 is not encrypted, an adversary may be able to obtain the PWD by monitoring the channel.

Figure 5:
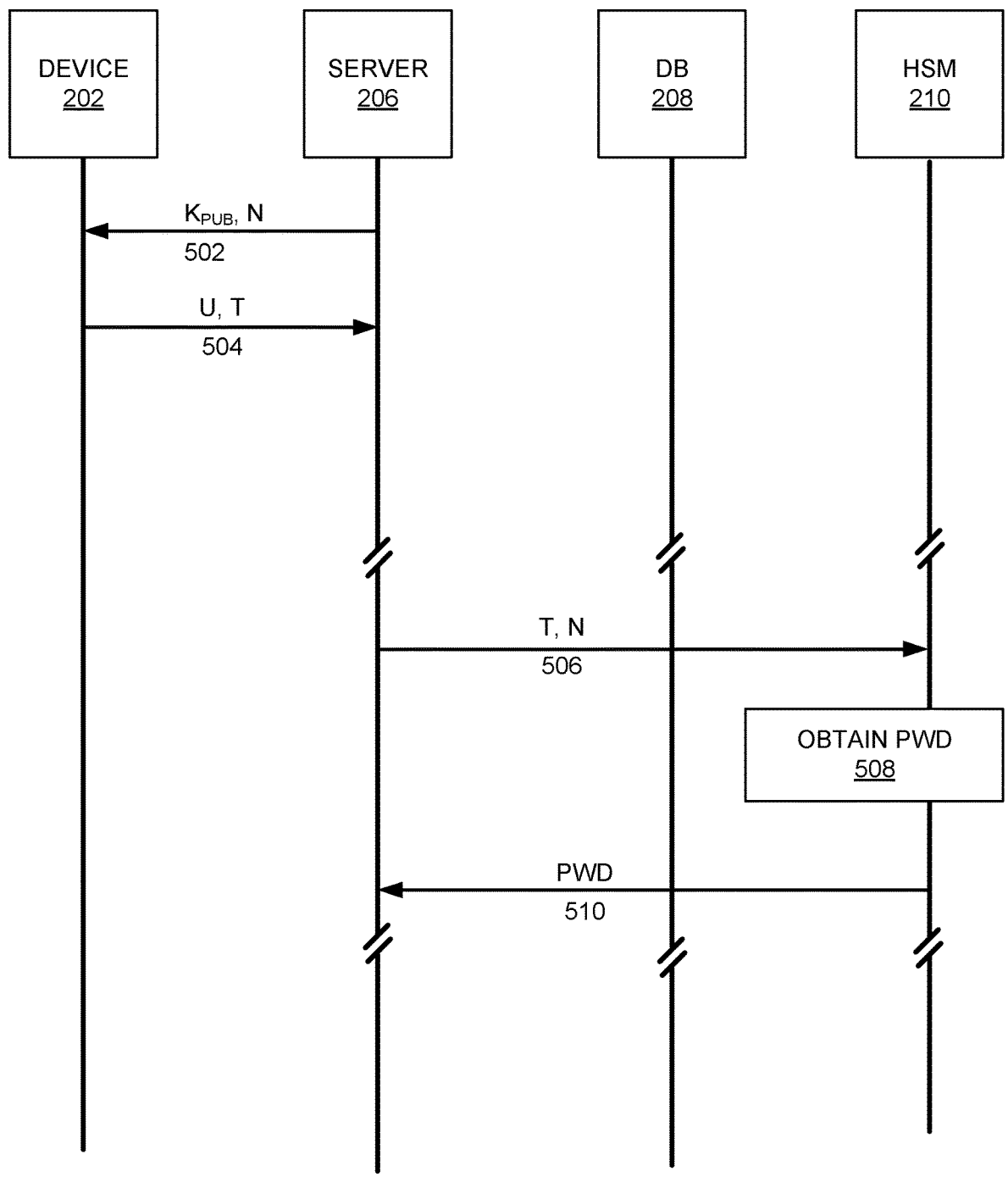
FIG. 5 is a sequence diagram that illustrates some exemplary actions between components illustrated in FIG. 2 for secure storage of passwords according to another implementation.

FIG. 5 is a sequence diagram that illustrates some exemplary actions between components illustrated in FIG. 2 for secure storage of passwords according to a different implementation. This implementation addresses the possibility that the channel between user device 202 and server 206 may not be encrypted.

For the diagram of FIG. 5, assume: that HSM 210 has generated the secret key $K_S$ and has stored $K_S$ in its non-volatile memory; that HSM 210 has a private key $K_{PRIV}$ and a public key $K_{PUB}$; and that database 208 stores MACs and salts for each usernames. For simplicity, FIG. 5 may not illustrate all actions that user device 202, server 206, and HSM 210 perform.

In FIG. 5, server 206 sends a $K_{PUB}$ and a newly generated nonce N to user device 202 (item 502). User device 202 receives a username U and a password PWD from the user, forms a concatenated string PWD∥N. and encrypts the PWD∥N using $K_{PUB}$ to produce the encrypted string T. By concatenating N to PWD before the encryption, it becomes much more difficult or impossible for an adversary to crack the password by capturing T. User device 202 then forwards U and T to server 206 (item 504) over the channel between user device 202 and server 206. Because T is encrypted, the underlying PWD is safe from an attacker that monitors the channel, even when the channel itself is not encrypted.

In contrast to FIG. 4 where the PWD is available at server 206 to be sent to HSM 210, however, server 206 in FIG. 5 is in possession of T in place of PWD. Hence, to perform actions similar to those for items 408-416 to complete the authentication process, server 206 in FIG. 5 first has to obtain PWD. To obtain PWD, server 206 sends T and N to HSM 210 (item 506). HSM 210 then uses its private key $K_{PRIV}$ to decrypt T and obtain PWD∥N. HSM 210 removes N from PWD∥N to derive PWD (item 508) and forwards PWD to server 206. Server 206 may then complete the authentication in a manner similar to that described for FIG. 4.

Figure 6:
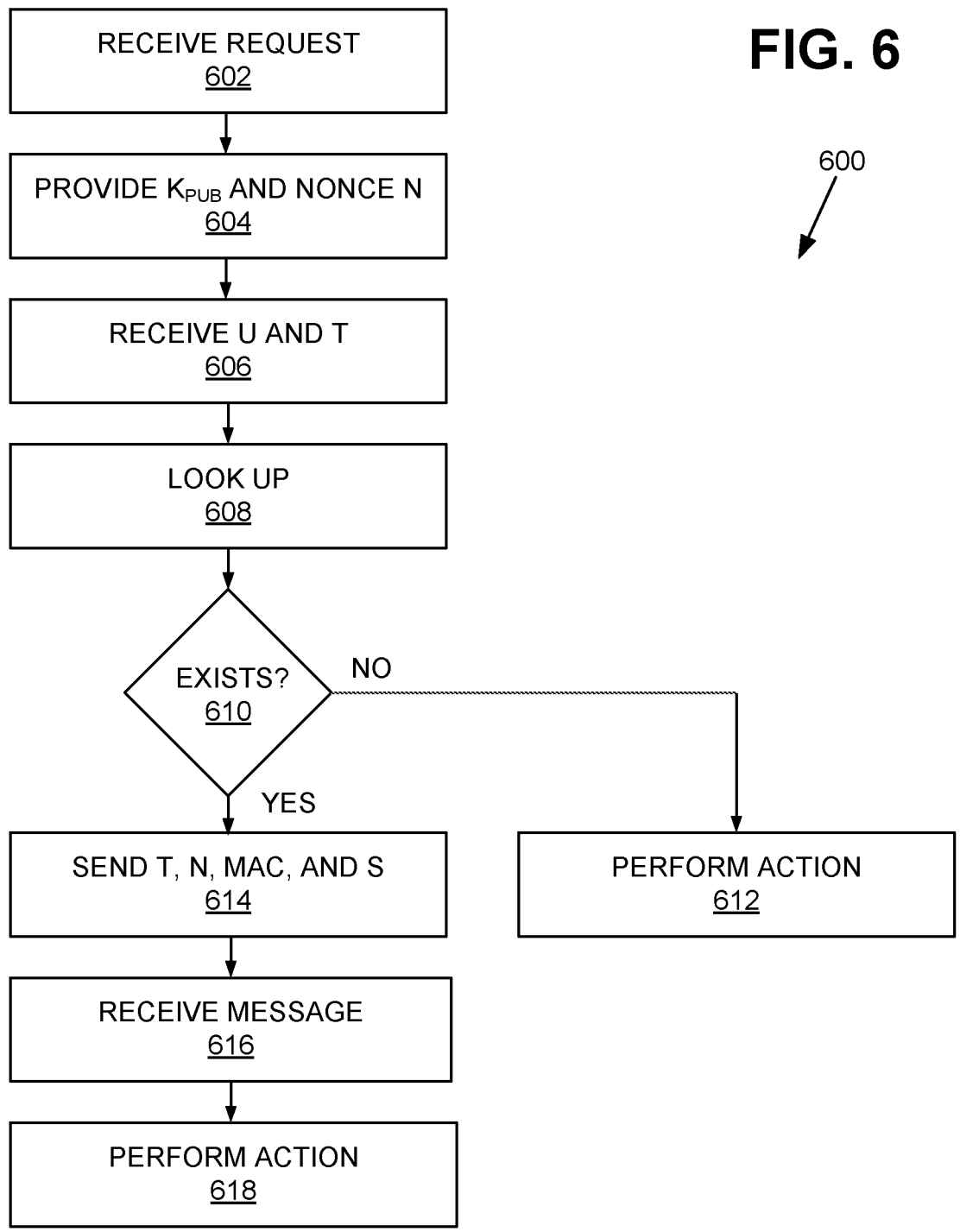
FIG. 6 is a flow diagram of an exemplary process that is associated with user authentication for secure storage of passwords according to yet another implementation.
Figure 7:
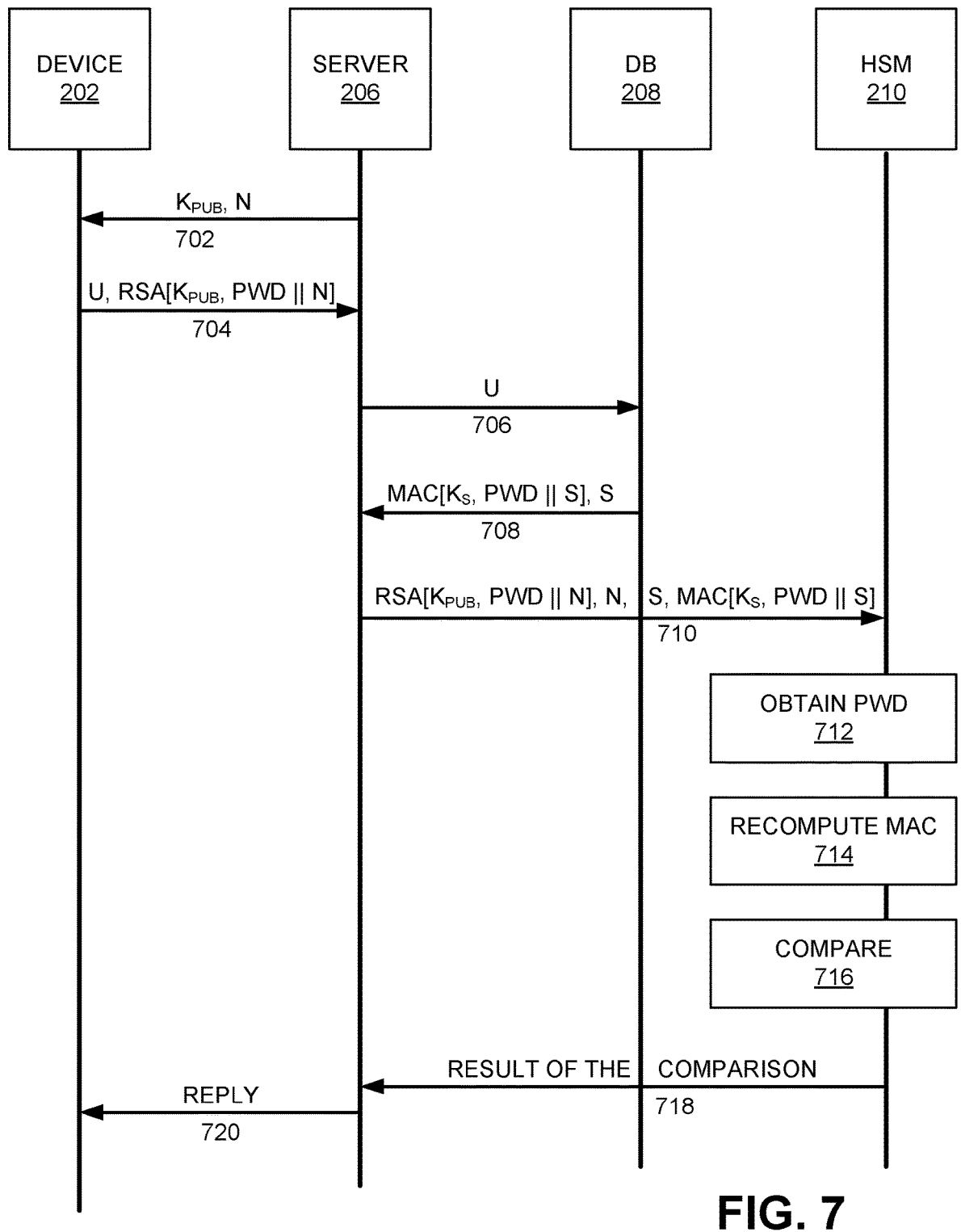
FIG. 7 is a sequence diagram that illustrates exemplary actions between components illustrated in FIG. 2 for the process of FIG. 6.

FIG. 6 is a flow diagram of an exemplary process 600 that is associated with authenticating a user for secure storage of passwords according to yet another implementation. FIG. 7 is a sequence diagram that illustrates exemplary actions performed by components shown in FIG. 2 during process 600 of FIG. 6. The implementation associated with FIGS. 6 and 7 is a result of combining the implementations associated with FIG. 4 and FIG. 5 and eliminating actions associated with sending PWD between HSM 210 and server 206.

Process 600 may be performed by server 206 in combination with HSM 210, and user device 202. Other components of network 203 may also be involved in or related to process 600 and/or actions in FIG. 7, but they are not illustrated in FIG. 6 or FIG. 7. In addition, FIG. 7 may not illustrate all actions that device 202, server 206, and HSM 210 perform.

For process 600, assume: that HSM 210 has generated the secret key $K_S$ and has stored $K_S$ in its non-volatile memory; and that HSM 210 has the private key $K_{PRIV}$ and the public key $K_{PUB}$; and that database 208 stores MACs and salts for each usernames.

As shown, process 600 may include server 206 receiving a request for authentication (block 602). Depending on the implementation, server 206 may receive the request over a secure channel (e.g., a TLS/SSL session). In response, server 206 may forward the public key $K_B$ and a newly generated nonce N to user device 202 (block 604; item 702).

User device 202 obtains a username U and a password PWD, either from a storage or from the user. After device 202 receives N and $K_{PUB}$ from server 206, device 202 concatenates password PWD with nonce N to generate the string PWD∥N. Using the public key $K_{PUB}$, user device 202 may then apply, for example, the Rivest-Shamir-Adleman (RSA) encryption to the string PWD∥N to generate the encrypted string T. User device 202 sends username U and encrypted string T. T is shown as RSA [$K_B$, PWD∥N] 704 in FIG. 7.

Server 206 receives U and T from user device 202 (block 606). In some implementations, the channel over which device 202 sends U and T is encrypted under the TLS/SSL protocol, Hence, U is secure during its transit over the channel. After the receipt of U and T, server 206 uses username U to look up the corresponding MAC and the salt S in database 208 (block 608; item 706).

At block 610, server 206 determines if the MAC corresponding to the username exists in database 208 (block 610). If the entry does not exist (block 610: NO), process 600 may proceed to perform appropriate actions, such as notifying user device 202 (block 612). However, if the entry does exist (block 610: YES), server 206 may retrieve the MAC and salt S from database 208 (item 708) and send the MAC, T, N, and S to HSM 210 (block 614; item 710).

When HSM 210 receives the MAC, T, N, and S, HSM 210 decrypts T using its private key $K_{PRIV}$. Decrypting T yields PWD∥N. By removing N (which HSM 210 received from server 206) from PWD∥N, HSM 210 obtains PWD (item 712). HSM 210 then appends S to PWD, to produce PWD∥S. HSM 210 regenerate a MAC based on the PWD∥S and secret key $K_S$ (item 714). Thereafter, HSM 210 compares the regenerated MAC to the one retrieved from database 208 and received via server 206 (item 716). If the MACs match, PWD is valid; otherwise PWD is not a valid password. HSM 210 sends the result of the comparison (whether the password is valid or not) to server 206 (item 718).

Process 600 includes server 206 receiving, from HSM 210, the message indicating whether password PWD is valid (block 616). Depending on whether the message indicates PWD is valid, server 206 may perform an appropriate action (block 618). For example, if the PWD is valid, server 206 may send a reply to user device 202 (item 720) to indicate that the user is authenticated. Server 206 may also authorize the user to access resources in network 203. In another example, if the MAC is invalid, server 206 may notify user device 202 and deny user device 202 access to network 203.

Figure 8:
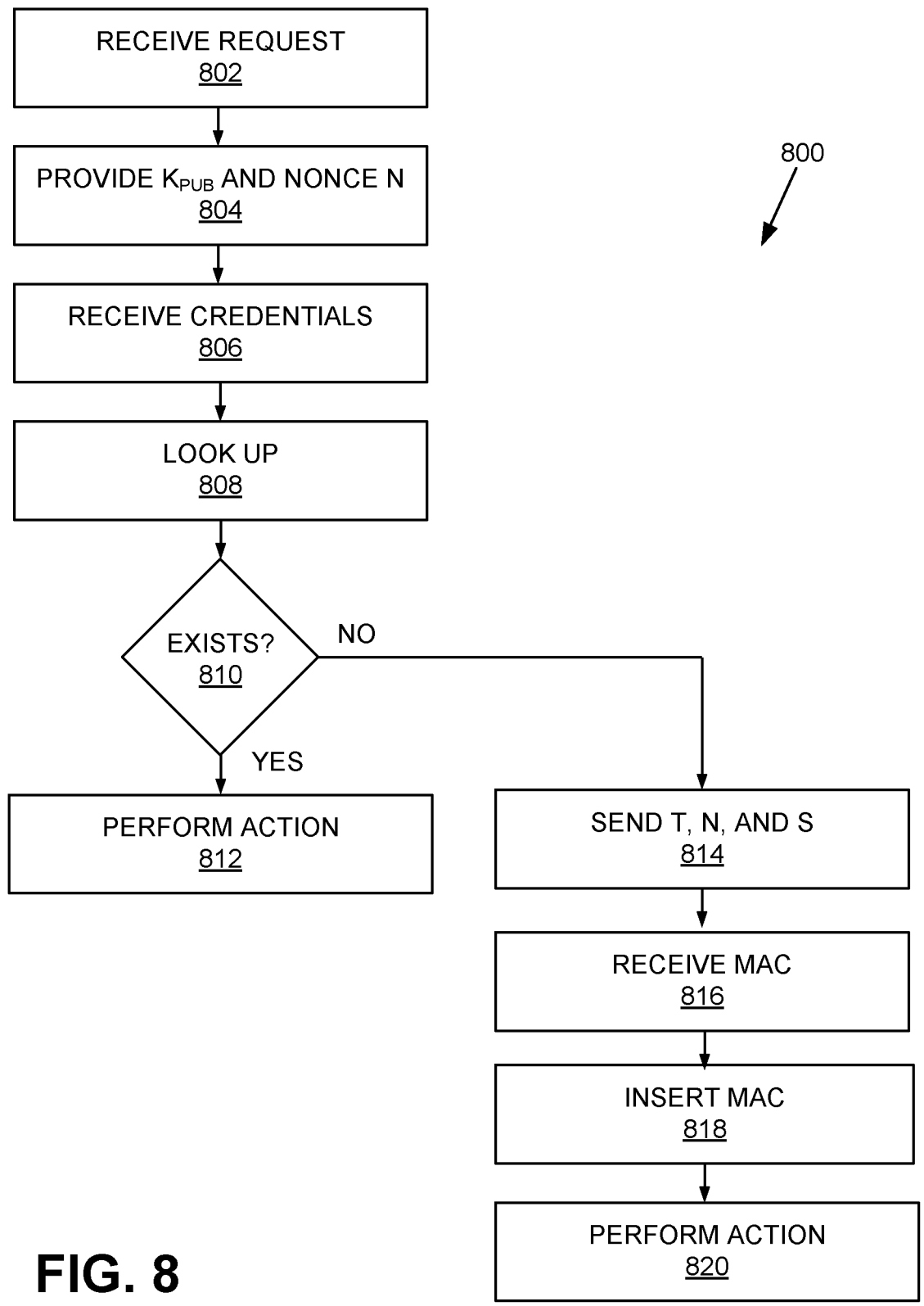
FIG. 8 is a flow diagram of an exemplary process that is associated with creating and storing a Message Authentication Code (MAC) for the user according to the implementation of FIGS. 6 and 7.

FIG. 8 is a flow diagram of an exemplary process 800 that is associated with creating and storing a MAC for the user. Process 800 may occur, for example, when the user creates a login account with an online vendor or a service provider; obtains an authorization to access resources; etc. Assumptions similar to the ones for process 600 hold for process 800.

As shown, process 800 includes server 206 receiving a request for creating a MAC for the user (block 802). The request may stem from a login account creation request or an attempt to gain authorization for a particular purpose. In response, server 206 may forward public key $K_B$ and a newly generated nonce N to user device 202 (block 804).

User device 202 obtains a username U and a plaintext password PWD from the user. After device 202 receives N and $K_{PUB}$ from server 206, user device 202 concatenates password PWD with nonce N to generate the string PWD∥N. Using the public key $K_{PUB}$, user device 202 then applies the RSA encryption to the string PWD∥N to obtain the encrypted string T. User device 202 sends U and T to server 206.

Server 206 receives U and T from user device 202 (block 806). After the receipt of U and T, server 206 looks up U in database 208 (block 808). If the lookup indicates that username U already exists (block 810: YES), server 206 performs an appropriate action (block 812) (e.g., sending a notification to user device 202 to indicate that username U already exists in database 208). If username U does not exist (block 810: NO), server 206 generates a new salt S, and sends T, N, and S to HSM 210 (block 814).

When HSM 210 receives T, N, and S, HSM 210 decrypts T using its private key $K_{PRIV}$, which yields PWD∥N. By removing N from PWD∥N, HSM 210 obtains PWD. Then, HSM 210 appends salt S to PWD, to produce PWD∥S. HSM 210 uses PWD∥S and $K_S$, to generate a new MAC. HSM 210 sends the MAC to server 206.

When server 206 receives the newly generated MAC from HSM 210 (block 816), server 206 inserts U, S, and the MAC into database 208 (block 818) and takes an appropriate action (block 820). The action may include, for example, notifying user device 202 that a login account has been created for the user, that the user now has the authority to access resources, etc.

In the above, if database 208 is stolen, the attacker will not be able to brute force crack any of the passwords. To crack the passwords, the attacker needs access to HSM 210. In many implementations, it is difficult to steal HSM 210, because after the power is removed, HSM 210 requires multiple authorized administrators/operators with multiple keys to start it again. The only realistic attack is to compromise server 206 and perform a brute force password cracking, by sending a set of T, N, and S and a MAC to HSM 210 for each guessed plaintext password. If HSM 210 validates the guessed password, the guessed password is the original plaintext password. Such a brute force method would have a low chance of success—it would probably be easier to trick targeted users to access user devices 102 through phishing attacks and obtain the plaintext passwords directly from the users.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

For example, in the above, while a series of blocks have been described with regard to the processes illustrated in FIGS. 6 and 8, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A device comprising:
a processor configured to:
generate a nonce;
send, to a user device, the nonce and a public key;
receive, from the user device, a username of a user and a string that includes a result of performing encryption, by the user device using the public key, of another string obtained by concatenating a plaintext password and the nonce;
retrieve, by using the user name, a salt and a first Message Authentication Code (MAC) that a Hardware Security Module (HSM) previously generated using a secret key internal to the HSM;
send the first MAC, the salt, and one or more parameters to the HSM;
receive, from the HSM, a message indicating whether the first MAC matches a second MAC that the HSM generates based on the one or more parameters, the salt, and the secret key internal to the HSM; and
perform an authentication of the user based on the message.

2. The device of claim 1, wherein the device further comprises the HSM, and wherein when the HSM generates the second MAC, the HSM is configured to:
apply the secret key to a result of concatenating the string and the salt.

3. The device of claim 1, wherein the processor is further to:
send the salt, the nonce, and the string to the HSM, wherein the HSM is configured to generate the first MAC based on the salt, the nonce, and the string.

4. The device of claim 3, wherein when the HSM generates the first MAC, the HSM is configured to:
apply a private key to the string to generate an output string comprising the plaintext password and the nonce; and
use the output string to generate the first MAC.

5. The device of claim 1, wherein the encryption comprises the Rivest-Shamir-Adleman (RSA) encryption.

6. The device of claim 1, wherein the one or more parameters include the nonce and the string.

7. The device of claim 6, wherein the device further comprises the HSM, and wherein when the HSM generates the second MAC, the HSM is configured to:
decrypt the string using the secret key to obtain a resultant string;
remove a portion corresponding to the nonce from the resultant string to obtain the plaintext password;
concatenate the plaintext password with the salt to obtain a salted password; and
use the salted password and a secret key to generate the second MAC.

8. The device of claim 1, wherein the processor is further configured to:
notify the user device whether the user is authenticated.

9. A method comprising: sending, to a user device, a nonce and a public key; receiving, from the user device, a username of a user and a string that includes a result of performing encryption, by the user device using the public key, of another string obtained by concatenating a plaintext password and the nonce; retrieving, by using the user name, a salt and a first Message Authentication Code (MAC) that a Hardware Security Module (HSM) previously generated using a secret key internal to the HSM; sending the first MAC, the salt, and one or more parameters to the HSM; receiving, from the HSM, a message indicating whether the first MAC matches a second MAC that the HSM generates based on the one or more parameters, the salt, and the secret key internal to the HSM; and performing, by a device, an authentication of the user based on the message.

10. The method of claim 9, wherein the device comprises the HSM, and wherein when the HSM generates the second MAC, the HSM is configured to:
apply the secret key to a result of concatenating the string and the salt.

11. The method of claim 9, further comprising:
sending the salt, the nonce, and the string to the HSM;
generating, by the HSM, the first MAC based on the salt, the nonce, and the string.

12. The method of claim 11, wherein generating the first MAC includes:
applying a private key to the string to generate an output string comprising the plaintext password and the nonce; and
using the output string to generate the first MAC.

13. The method of claim 9, wherein the encryption comprises the Rivest-Shamir-Adleman (RSA) encryption.

14. The method of claim 9, wherein the one or more parameters include the nonce and the string.

15. A non-transitory computer-readable medium, comprising computer-executable instructions, wherein when executed by a processor included in a device, the instructions cause the processor to:
generate a nonce;
send, to a user device, the nonce and a public key;
receive, from the user device, a username of a user and a string that includes a result of performing encryption, by the user device using the public key, of another string obtained by concatenating a plaintext password and the nonce;
retrieve, by using the user name, a salt and a first Message Authentication Code (MAC) that a Hardware Security Module (HSM) previously generated using a secret key internal to the HSM;
send the first MAC, the salt, and one or more parameters to the HSM;
receive, from the HSM, a message indicating whether the first MAC matches a second MAC that the HSM generates based on the one or more parameters, the salt, and the secret key internal to the HSM; and
perform an authentication of the user based on the message.

16. The non-transitory computer-readable medium of claim 15, wherein the one or more parameters include the nonce and the string.

17. The non-transitory computer readable medium of claim 15, wherein the device comprises the HSM, and wherein when the HSM generates the second MAC, the HSM is configured to:
apply the secret key to a result of concatenating the string and the salt.

18. The non-transitory computer-readable medium of claim 15, wherein the instructions further cause the processor to:
send the salt, the nonce, and the string to the HSM, wherein the HSM is configured to generate the first MAC based on the salt, the nonce, and the string.

19. The non-transitory computer-readable medium of claim 15, wherein the encryption comprises the Rivest-Shamir-Adleman (RSA) encryption.

20. The non-transitory computer-readable medium of claim 15, wherein the instructions further cause the processor to:
notify the user device whether the user is authenticated.

* * * * *